United States Patent
Shakir et al.

(10) Patent No.: US 7,943,691 B2
(45) Date of Patent: May 17, 2011

(54) HEAT TOLERANT, OPTICALLY CLEAR CPVC AND METHOD OF MAKING SAME

(75) Inventors: Saleem Shakir, Westlake, OH (US); Sang Lee, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 181 days.

(21) Appl. No.: 12/294,596

(22) PCT Filed: Mar. 27, 2007

(86) PCT No.: PCT/US2007/064994
§ 371 (c)(1),
(2), (4) Date: Sep. 25, 2008

(87) PCT Pub. No.: WO2007/121046
PCT Pub. Date: Oct. 25, 2007

(65) Prior Publication Data
US 2009/0169785 A1    Jul. 2, 2009

Related U.S. Application Data

(60) Provisional application No. 60/744,639, filed on Apr. 11, 2006.

(51) Int. Cl.
*C08K 5/01*     (2006.01)
*B32B 27/08*    (2006.01)
(52) U.S. Cl. ...................... 524/487; 428/36.6
(58) Field of Classification Search ................ 524/487
See application file for complete search history.

(56) References Cited

U.S. PATENT DOCUMENTS

| | | | |
|---|---|---|---|
| 4,459,387 A | 7/1984 | Parker | |
| 4,710,533 A | 12/1987 | Neuman | |
| 4,820,750 A | 4/1989 | Lehr et al. | |
| 4,868,247 A | 9/1989 | Lehr et al. | |
| 4,888,148 A | 12/1989 | Hartitz | |
| 5,026,582 A | 6/1991 | Hartitz | |
| 5,268,424 A | 12/1993 | Lawson | |
| 5,274,043 A * | 12/1993 | Greenlee et al. | 525/239 |
| 5,591,497 A | 1/1997 | Hartitz | |
| 5,603,998 A | 2/1997 | Hartitz | |
| 5,604,278 A * | 2/1997 | Hartitz | 524/399 |
| 5,769,128 A | 6/1998 | Auvil et al. | |
| 5,775,378 A | 7/1998 | Auvil et al. | |
| 5,969,045 A | 10/1999 | Schmitz et al. | |
| 6,531,526 B1 | 3/2003 | Detterman | |
| 6,590,041 B1 | 7/2003 | Eguchi et al. | |
| 7,144,952 B1 * | 12/2006 | Court et al. | 525/94 |
| 2003/0157321 A1 * | 8/2003 | Dalal et al. | 428/369 |
| 2006/0111495 A1 * | 5/2006 | Tabla et al. | 524/394 |

FOREIGN PATENT DOCUMENTS

| | | | |
|---|---|---|---|
| EP | 0107063 A | | 5/1984 |
| JP | 2004107520 | * | 4/2004 |

OTHER PUBLICATIONS

Translation of JP 20041007520, Apr. 2004.*

* cited by examiner

*Primary Examiner* — Ling-Siu Choi
*Assistant Examiner* — Hui Chin
(74) *Attorney, Agent, or Firm* — John H. Hornickel

(57) ABSTRACT

A high HDT CPVC compound that is optically clear is disclosed. The choice of CPVC resin, the use of external lubricants, and other optional ingredients achieves a threshold of optical clarity for the compound to be used to make optically clear articles via extrusion or molding. An optically clear CPVC industrial pipe is particularly useful for monitoring of fluid flow.

15 Claims, No Drawings

US 7,943,691 B2

HEAT TOLERANT, OPTICALLY CLEAR CPVC AND METHOD OF MAKING SAME

CLAIM OF PRIORITY

This application claims priority from U.S. Provisional Patent Application Ser. No. 60/744,639 filed on Apr. 11, 2006, which is incorporated by reference.

FIELD OF THE INVENTION

This invention relates to chlorinated poly(vinyl chloride) ("CPVC") compounds and a method of making them.

BACKGROUND OF THE INVENTION

CPVC is a polymer often used in pipes for industrial and commercial structures because of its retained strength in the presence of high heat temperatures of solids and fluids travelling through such pipe.

The conventional CPVC pipe is either opaque or no more than barely translucent, meaning that one can not see whether liquid, solids, gases, or a combination of them is traveling through such pipe. For example, one can not look into the pipe to determine the location of a blockage or weakness.

The conventional opaque CPVC pipe may or may not have heat tolerance, as determined by Heat Deflection Temperature ("HDT") tests.

SUMMARY OF THE INVENTION

What the art needs are high HDT, optically clear CPVC compounds to be used to make pipe and other industrial articles.

The present invention solves that problem by using particular ingredients in a high HDT CPVC compound, so that, when the compound is extruded as a pipe or other industrial equipment, the resulting article is optically clear.

One aspect of the present invention is a high Heat Deflection Temperature CPVC compound, comprising heat chlorinated CPVC; external lubricant; heat stabilizer; and optional ingredients; wherein (a) the compound is essentially free of internal lubricants; (b) the compound has a high heat deflection temperature; and (c) the compound is optically clear.

Another aspect of the present invention is an article made from the optically clear CPVC pipe.

For purposes of this invention, a high Heat Deflection Temperature (HDT) is at least about 88° C. (190° F.) using ASTM Test D-648 for an unannealed plaque having dimension of 15 cm length, 15 cm width, and 0.3 cm (0.125 inches) thickness.

For purposes of this invention, both "optically clear" and "optical clarity" mean a Haze of no greater than about 22 using ASTM Test D1003-00.

A feature of the invention is that the bulk of the resulting article made from the compound of the invention does not scatter light incident to that surface.

A benefit of the invention that when formed into a pipe or other article carrying or containing fluids, one can look through the surface and the bulk to see solids, fluids, or both within the article.

Other features and advantages will be described in relation to the following embodiments.

EMBODIMENTS OF THE INVENTION

CPVC Compounds

CPVC is essentially a homopolymer or copolymer of vinyl chloride with minor amounts of other co-monomers, if any. CPVC is chlorinated PVC where PVC containing approximately 57% chlorine is further reacted with chlorine radicals produced from chlorine gas dispersed in water and irradiated to generate chlorine radicals dissolved in water to produce CPVC, a polymer with a higher glass transition temperature (Tg) and heat distortion temperature. Commercial CPVC typically contains by weight from about 58% to about 70% and preferably from about 63% to about 68% chlorine.

Poly(vinyl chloride), from which CPVC is prepared, comprises polymerized vinyl chloride monomer where preferred polymers are essentially homopolymerized vinyl chloride with little or no copolymerized co-monomers. Useful co-monomers if desired include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful CPVC copolymers can contain from about 0.1% to about 10% or 15%, preferably from about 0.5% to about 5%, by weight of copolymerized co-monomer.

CPVC copolymers can be obtained by chlorinating such PVC copolymers using conventional methods such as that described in U.S. Pat. No. 2,996,489, which is incorporated herein by reference.

Preferred PVCs as starting materials are suspension polymerized vinyl chloride, although less preferred mass (bulk) polymerized can be useful. Rigid PVCs contain essentially no plasticizer, and preferably less than about 10 or about 5 weight parts of copolymerized co-monomer based 100 weight parts of vinyl chloride, and most preferably are essentially homopolymers of vinyl chloride.

Useful weight average molecular weights of CPVCs can be from about 39,000 to about 150,000, and preferably from about 55,000 to about 109,000, where the molecular weight is measured by size exclusion chromatography and correlated to absolute PVC molecular weights determined by Perkins et al., Journal of Vinyl Technology, Vol. 15, No. 2 (1993).

The base polyvinyl chloride (PVC) resin used to make CPVCs of this invention can have an inherent viscosity from about 0.45 to about 1.5 and preferably from about 0.68 to about 1.2, as measured by using 0.2 grams of resin in 100 ml of cyclohexanone at 30 degrees C. by ASTM D 1243.

The CPVCs of this invention have a K Value ranging from about 53 to 60 and preferably from about 55 to 58.

Commercially available CPVC resins can be used meeting the specifications stated above. Non-limiting sources of commercial CPVC resin are Sekisui America Corporation of New York, N.Y., USA; Kaneka Texas Corporation of Pasadena, Tex., USA; and Noveon Corporation of Brecksville, Oh., USA. Of these sources, high HDT CPVC resin from Sekisui is preferred because better optical clarity as measured by haze can be obtained. While not being limited to any particular theory, it is possible that the heat chlorination process used by Sekisui to make CPVC contributes to its value.

The present invention has determined that optical clarity can be achieved by selection of the following ingredients as a preferred embodiment. But, without undue experimentation, one skilled in the art can establish a formulation to make a high HDT optically clear CPVC compound using other commercial ingredients, so long as the resulting haze is not greater than about 22%, desirably less than about 20%, and preferably less than about 18%. It has been found in this invention that one can obtain an extruded pipe made from compounds of the present invention that have a haze of less than about 16%.

Another factor in compounds of the present invention is luminous transmittance, also known as optical transmission, measured also using ASTM test D-1003-00. Compounds of the present invention can have an optical transmission of at least 36%, desirably at about 39%, and preferably at least about 42%. It has been found in this invention that one can obtain an extruded pipe made from compounds of the present invention that have a luminous transmittance of at least about 50%.

It should be apparent to those skilled in the art that an optically clear extrudate from a compound of the present invention is not necessarily a colorless extrudate. The color of the extrudate is determined by its ingredients, method of manufacture, and other variables. It has been found that a preferred CPVC formulation made into a pipe of the present invention has a straw-yellow color. Compounds of the present invention can have a yellowness index of no greater than about 78, desirably no greater than about 68, and preferably no greater than about 58. It has been found in this invention that one can obtain an extruded pipe made from compounds of the present invention that have a yellowness index (both far and near) of no more than 42.

Manual examination of a straw-yellow colored pipe (one inch nominal Schedule 40 size) made from a compound of the present invention revealed that one could see through the pipe with sufficient detail to read the Times New Roman 12 pitch font or to see the detail of wrinkles of a human finger. One was not able to see fingerprints of a human finger.

Lubricant

Lubricants are conventional additives to polyvinyl halide compounds. There are generally two types: internal lubricants which assist the mixing and dispersion of the ingredients within the shearing action of an extruder and external lubricants which assist the molten mass to move through the extruder.

Conventionally, both internal lubricants and external lubricants are added to a typical CPVC compound. However, in this invention, because a high HDT CPVC compound is needed, internal lubricants which adversely affect HDT properties are not intentionally used. Therefore, compounds of the present invention are essentially free of internal lubricants.

There are many commercially available external lubricants such as stearates, paraffin waxes, other esters, etc. The amount of external lubricants in the present invention can range from about 1 to about 4 parts per hundred of resin (phr), and preferably from about 2 to about 3 phr.

Heat Stabilizer

Heat stabilizers are a common ingredient for PVC and CPVC compounds. Typical heat stabilizers include organometallic esters and mercaptides, such as octyl tin maleate stabilizers and octyl tin mercaptide stabilizers.

Optional Additives

The compound of the present invention can include conventional plastics additives in an amount that is sufficient to obtain a desired processing or performance property for the compound, so long as the optional additive does not harm the optical clarity of the compound when formed into an article such as a pipe. The amount should not be wasteful of the additive nor otherwise detrimental to the processing or performance of the compound. Those skilled in the art of thermoplastics compounding, without undue experimentation but with reference to such treatises as *Plastics Additives Database* (2004) from Plastics Design Library (www.willia-mandrew.com), can select from many different types of additives for inclusion into the compounds of the present invention.

In compounding rigid CPVCs, other compounding ingredients are desirably incorporated into the CPVC resins to produce compounding formulas. Other compounding ingredients can include fillers, pigments and colorants if desired, impact modifiers, uv-stabilizers, other processing aids, as well as other additives such as biocides or flame retardants.

Fillers ordinarily are used to reduce cost and gloss and can include conventional calcium carbonates, clay, talc, mica, and diatomaceous earth fillers. Useful pigments and colorants can be organic, but preferably mineral such as titanium dioxide (which also serves as a uv-stabilizer).

Impact modifiers are useful in rigid CPVCs to increase toughness and can include chlorinated polyethylenes, ABS, acrylic polymers and copolymers, or methacrylic copolymers such as methylmethacrylate-butadiene-styrene (MBS).

Other processing aids for extruding rigid CPVCs in complex profiles include acrylic or styrene-acrylonitrile copolymers to prevent edge tear in the extrusion of complex profiles or configurations.

A wide variety of CPVC compound formulations are commercially available to one of ordinary skill in the art. Moreover, the literature teaches a number of CPVC formulations, such as those disclosed in U.S. Pat. No. 6,531,526 (Detterman et al.).

Typically, a CPVC compound contains CPVC polymer, stabilizer, process aid, impact modifier, lubricant, and pigment.

The ingredients are expressed in parts per hundred of CPVC polymer. Table 1 shows acceptable and preferred ingredients for the compounds of the present invention, expressed in parts per hundred of CPVC resin. Because all ingredients but the CPVC are optional, all are listed as having a range from 0 to a higher value

TABLE 1

| Ingredient | Parts Per Hundred Resin Ranges | |
|---|---|---|
| | Acceptable | Preferred |
| CPVC Resin | 100 | 100 |
| Heat stabilizer | 1-4 | 2.5-3.5 |
| Impact modifier | 0-15 | 5-10 |
| Process aid for fusion | 0-4 | 0.25-2 |
| External Lubricant | 1-4 | 2-3 |
| Pigment | 0-4 | 0-2 |

Preferable among commercial CPVC resins is "PVC-HA" post-chlorinated polyvinyl chloride resins from Sekisui America Corporation of New York, N.Y., USA and especially grade HA-27K (K-58, 66.5% Cl).

Processing

The preparation of compounds of the present invention is uncomplicated to those skilled in the art of thermoplastic compounding. The compound of the present can be made in batch or continuous operations.

Mixing in a continuous process typically occurs in an extruder, continuous mixer, or other device that is elevated to a temperature that is sufficient to melt the polymer matrix with addition either at the head of the extruder or downstream in the extruder of the solid ingredient additives. Extruder speeds are dependent on the size of the extruder and can range from about 50 to about 500 revolutions per minute (rpm), and preferably from about 100 to about 300 rpm for most extruders having a diameter of approximately 5 to 23 cm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives of any optional additive. The mixing speeds range from 60 to 1000 rpm and temperature of mixing can be ambient. Also, the output from the mixer is chopped into smaller sizes for later extrusion or molding into polymeric articles.

Alternatively, mixing in a batch process typically occurs in a Henschel mixer that mixes via mechanical action rather than bringing the polymer matrix a melting temperature. The mixing speeds range from 60 to 1000 rpm and temperature of mixing can be ambient. Also, the output from the mixer in powder form can be used as is or fed into a compounding maching is chopped into smaller sizes for later extrusion or molding into polymeric articles.

Compounds can be formed into powder, cubes, or pellets for further extrusion or molding into polymeric building construction components.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Extrudate pipe and molded fittings for such pipe made using a CPVC compound of the present invention that is optically clear provides considerable advantages to one constructing or maintaining industrial pipes. With optical clarity, one can provide greater safety conditions by being able to visually locate blockages, constrictions, interior defects, etc. that are not possible to be seen with either an opaque or translucent but hazy pipe.

Other uses of compound of the present invention include planar sheets of compound used in industrial environments that place a high premium on low flammability of the contents of the environment. CPVC compounds of the present invention provide not only clarity but also low flammability because the compound does not contribute to the fuel load nor does it have self-ignition properties. Clean rooms for assembly of sensitive electronic components and devices are an example of such industrial environments.

Examples

Table 2 shows the source of ingredients used for the examples used to demonstrate the present invention.

TABLE 2

Source of Ingredients

| Ingredient Name | Examples 1 and 2 Amount (phr) | Examples 3 and 4 Amount (phr) | Comparison Example B Amount (phr) | Comparison Example B Amount (phr) | Weight Percent |
|---|---|---|---|---|---|
| Seksui HA-27K (58 K, 66.5% Cl) CPVC Resin | 100.0 | | | | 87.18% |
| Seksui HA-17F (55 K, 64.8% Cl) CPVC Resin | | 100.0 | | | |
| Kaneka H-516A (55 K, 65.0% Cl) CPVC Resin | | | 100.0 | | |
| Kaneka H-727A (58 K, 67.0% Cl) CPVC Resin | | | | 100.0 | |
| Mark Octyl Tin Mercaptide stabilizer | 2.5 | 2.5 | 2.5 | 2.5 | 2.18% |
| Mark Octyl Tin Maleate stabilizer | 0.5 | 0.5 | 0.5 | 0.5 | 0.44% |
| Plastistrength P-770 acrylic process aid | 2.0 | 2.0 | 2.0 | 2.0 | 1.74% |
| Kane Ace B-51 MBS impact modifier | 7.0 | 7.0 | 7.0 | 7.0 | 6.10% |
| Calcium Stearate external lubricant | 0.2 | 0.2 | 0.2 | 0.2 | 0.17% |
| Emerest 2326 external lubricant | 0.5 | 0.5 | 0.5 | 0.5 | 0.44% |
| Kao Wax 220 external lubricant | 1.5 | 1.5 | 1.5 | 1.5 | 1.31% |
| 12-OH Stearic Acid external lubricant | 114.7 | 114.7 | 114.7 | 114.7 | |

Table 3 shows the manufacturing conditions for all Examples and Comparative Examples, based on high intensity mixing and then milling.

TABLE 3

| Mixing and Milling | |
|---|---|
| Equipment | Henschel 10 liter mixer |
| Mixing Speed | 1200 rpm |
| Order of Addition of Ingredients | CPVC Resin, Stabilizer, Processing Aid, Lubricants, and Impact Modifier |
| Drop Temperature | 170° F. |
| Form of Product | Free flowing powder |
| Equipment | Two Roll Mill (6 in. × 12 in.) with 0.135 in. gap |
| Mixing Speed | 44 rpm |
| Temperature | 365° F. |
| Time on Mill | 2 minutes after banding |
| Form of Product | Mill slabs |

Thereafter, the Examples and Comparative Examples were then molded into plaques using compression molding techniques as explained in Table 4.

TABLE 4

| Molding | |
| --- | --- |
| Maximum Pressure | 1300 psi |
| Press Temperature | 370° F. |
| Preheat Time | 80 seconds with no pressure |
| Pressure Ramp-Up | 180 seconds |
| Time at Max. Pressure | 140 seconds |
| Cool Down Time | 360-420 seconds with no pressure |
| Form of Product | Plaques |

Two sets of plaques of each of the Examples and Comparative Examples were tested for Haze and Transmission (ASTM D1003-00) and Yellowness Index using a DataColor SF600+ spectrophotometer. All plaques were conditioned for 40 hours at 23° C. (+/−2° C.) and 50% (+/−5%) Relative Humidity. A C2 luminant was used. Table 5 shows the results, including an average value for the two sets of plaques of Example which were measured for Haze, Transmission, and Yellowness Index.

TABLE 5

Experimental Results

| Example | | Near Lens (far) | | | Near Sphere | | | Trans-mission | Haze | (far) YI | (near) YI |
| --- | --- | --- | --- | --- | --- | --- | --- | --- | --- | --- | --- |
| | | X | Y | Z | X | Y | Z | | | | |
| 1 | a | 42.50 | 43.06 | 19.80 | 50.82 | 52.53 | 25.74 | 43.1 | 18.03 | 77.34 | 71.63 |
| 1 | b | 41.30 | 41.74 | 18.87 | 49.71 | 51.29 | 24.72 | 41.7 | 18.62 | 78.46 | 72.72 |
| | Average | | | | | | | 42.40 | 18.32 | 77.90 | 72.18 |
| 2 | a | 44.65 | 45.31 | 25.91 | 53.40 | 55.24 | 33.95 | 45.3 | 17.98 | 65.25 | 58.34 |
| 2 | b | 48.45 | 49.45 | 30.91 | 57.30 | 59.46 | 39.77 | 49.5 | 16.83 | 58.90 | 52.21 |
| | Average | | | | | | | 47.38 | 17.41 | 62.08 | 55.28 |
| 3 | a | 47.24 | 48.84 | 25.20 | 54.83 | 57.48 | 31.05 | 48.8 | 15.03 | 68.88 | 64.57 |
| 3 | b | 48.58 | 50.21 | 26.50 | 55.83 | 58.47 | 32.26 | 50.2 | 14.13 | 67.63 | 63.49 |
| | Average | | | | | | | 49.53 | 14.58 | 68.26 | 64.03 |
| 4 | a | 55.78 | 57.49 | 41.45 | 62.97 | 65.57 | 49.64 | 57.5 | 12.32 | 47.52 | 42.44 |
| 4 | b | 55.27 | 56.84 | 41.47 | 62.98 | 65.47 | 50.40 | 56.8 | 13.18 | 46.89 | 41.28 |
| | Average | | | | | | | 57.17 | 12.75 | 47.21 | 41.86 |
| A | a | 35.33 | 34.98 | 15.17 | 45.05 | 45.90 | 21.76 | 35.0 | 23.79 | 83.02 | 75.13 |
| A | b | 32.33 | 31.91 | 14.26 | 43.30 | 44.19 | 21.99 | 31.9 | 27.79 | 82.04 | 72.42 |
| | Average | | | | | | | 33.45 | 25.79 | 82.53 | 73.78 |
| B | a | 27.15 | 25.77 | 6.60 | 36.21 | 35.36 | 10.11 | 25.8 | 27.12 | 107.36 | 100.50 |
| B | b | 26.45 | 24.96 | 5.91 | 35.37 | 34.31 | 9.01 | 25.0 | 27.25 | 110.25 | 103.81 |
| | Average | | | | | | | 25.37 | 27.19 | 108.81 | 102.16 |

Examples 1-4 are clearly superior in haze and transmission to Comparative Examples A and B. With the only variable among the Examples 1, 3, A, and B being the choice of CPVC resin employed, one can make the direct numerical comparisons which show vast improvement of both haze and transmission as well as yellowness index. For purposes of claiming this invention, the differences between the CPVC resin of Examples 1-4 and Comparative Examples A and B shall be called "heat chlorinated" for Examples 1-4. By comparing Examples 1 and 3 with 2 and 4, one can see that there are no limitations in the method of molding, because both compression molding and injection molding perform similarly well.

The invention is not limited to the above embodiments. The claims follow.

What is claimed is:

1. A CPVC compound, comprising:
   heat chlorinated CPVC;
   external lubricant;
   heat stabilizer;
   and optional ingredients;
   (a) wherein the compound is essentially free of internal lubricants;
   (b) wherein the compound has a high heat deflection temperature;
   (c) wherein the compound is optically clear;
   (d) wherein the heat chlorinated CPVC is a homopolymer or copolymer of vinyl chloride with minor amounts of other co-monomers, if any, containing by weight from about 58% to about 70% chlorine;
   (e) wherein the heat chlorinated CPVC has an inherent viscosity from about 0.45 to about 1.5, as measured by using 0.2 grams of resin in 100 ml of cyclohexanone at 30 degrees C. by ASTM D 1243; and
   (f) wherein the heat chlorinated CPVC has a weight average molecular weight of from about 39,000 to about 150,000 and a K value ranging from about 53 to 60.

2. The compound of claim 1, wherein the heat chlorinated CPVC contains from about 63% to about 68% chlorine.

3. The compound of claim 1, wherein the co-monomer is selected from the group consisting of mono-unsaturated ethylenically unsaturated monomer, vinyl acetate monomer, vinylidene chloride monomer, acrylic monomer, vinyl aromatic monomer, vinyl ester monomer, and combinations thereof, and wherein the co-monomer is present in an amount from about 0.1% to about 15% by weight of copolymer.

4. The compound of claim 1, wherein the heat chlorinated CPVC has a haze that is not greater than about 22%.

5. The compound of claim 1, wherein the heat chlorinated CPVC has an optical transmission of at least about 36%.

6. The compound of claim 1, wherein the heat chlorinated CPVC has a yellowness index of no greater than about 78.

7. The compound of claim 1, wherein the external lubricant is selected from the group consisting of stearates, paraffin waxes, lubricating esters, and combinations thereof and is present in an amount ranging from about 1 to about 4 parts per hundred of heat chlorinated CPVC.

8. The compound of claim 1, wherein the heat stabilizer is selected from the group consisting of organometallic esters, mercaptides and combinations thereof and is present in an amount ranging from about 1 to about 4 parts per hundred of heat chlorinated CPVC.

9. An optically clear article made from the CPVC compound of claim 1.

10. The article of claim 9, wherein the article is an extruded pipe.

11. The article of claim 9, wherein the article is a planar sheet of the compound.

12. The article of claim 9, wherein the heat chlorinated CPVC contains by weight from about 63% to about 68% chlorine.

13. The article of claim 9, wherein the heat chlorinated CPVC has a haze that is not greater than about 22%, and wherein the heat chlorinated CPVC has a yellowness index of no greater than about 78.

14. The article of claim 9, wherein the external lubricant is selected from the group consisting of stearates, paraffin waxes, lubricating esters, and combinations thereof and is present in an amount ranging from about 1 to about 4 parts per hundred of heat chlorinated CPVC.

15. The article of claim 9, wherein the heat stabilizer is selected from the group consisting of organometallic esters, mercaptides and combinations thereof and is present in an amount ranging from about 1 to about 4 parts per hundred of heat chlorinated CPVC.

\* \* \* \* \*

UNITED STATES PATENT AND TRADEMARK OFFICE
CERTIFICATE OF CORRECTION

| | |
|---|---|
| PATENT NO. | : 7,943,691 B2 |
| APPLICATION NO. | : 12/294596 |
| DATED | : May 17, 2011 |
| INVENTOR(S) | : Saleem Shakir and Sang Lee |

It is certified that error appears in the above-identified patent and that said Letters Patent is hereby corrected as shown below:

Table 2 at Column 6, lines 18-42 should be replaced by the following table:

| Table 2 | | | | | |
|---|---|---|---|---|---|
| Source of Ingredients | | | | | |
| Ingredient Name | Examples 1 and 2 Amount (phr) | Examples 3 and 4 Amount (phr) | Comparison Example B Amount (phr) | Comparison Example B Amount (phr) | Weight Percent |
| Sekuri HA-27K (58 K, 66.5% Cl) CPVC Resin | 100.0 | | | | 87.18% |
| Sekuri HA-17P (55 K, 64.8% Cl) CPVC Resin | | 100.0 | | | |
| Kaneka H-516A (55 K, 65.0% Cl) CPVC Resin | | | 100.0 | | |
| Kaneka H-727A (58 K, 67.0% Cl) CPVC Resin | | | | 100.0 | |
| Mark Octyl Tin Mercaptide stabilizer | 2.5 | 2.5 | 2.5 | 2.5 | 2.18% |
| Mark Octyl Tin Maleate stabilizer | 0.5 | 0.5 | 0.5 | 0.5 | 0.44% |
| Plastistrength P-770 acrylic process aid | 2.0 | 2.0 | 2.0 | 2.0 | 1.74% |
| Kane Ace B-51 MBS impact modifier | 7.0 | 7.0 | 7.0 | 7.0 | 6.10% |
| Calcium Stearate external lubricant | 0.2 | 0.2 | 0.2 | 0.2 | 0.17% |
| Emerest 2326 external lubricant | 0.5 | 0.5 | 0.5 | 0.5 | 0.44% |
| Kao Wax 220 external lubricant | 1.5 | 1.5 | 1.5 | 1.5 | 1.31% |
| 12-OH Stearic Acid external lubricant | 0.5 | 0.5 | 0.5 | 0.5 | 0.44% |
| Total | 114.7 | 114.7 | 114.7 | 114.7 | 100% |

Signed and Sealed this
Sixteenth Day of August, 2011

David J. Kappos
*Director of the United States Patent and Trademark Office*